May 8, 1956  A. ALEXEEV  2,744,414
TRANSMISSION SPEED CHANGER
Filed Jan. 26, 1953  2 Sheets-Sheet 1
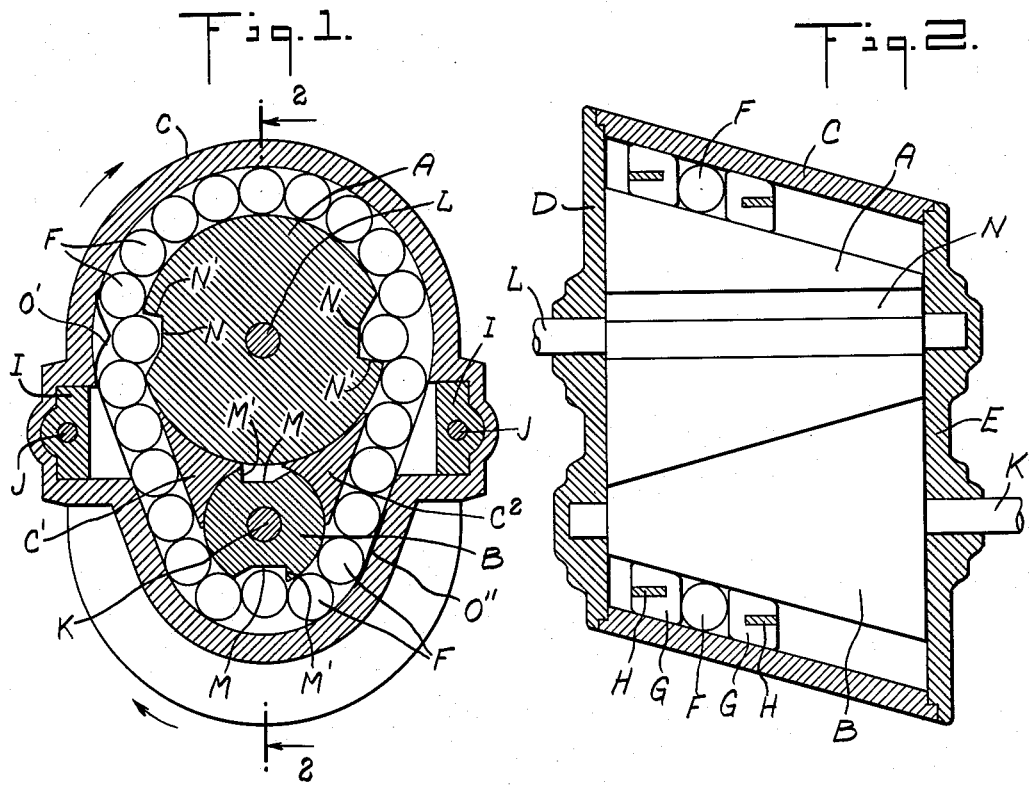
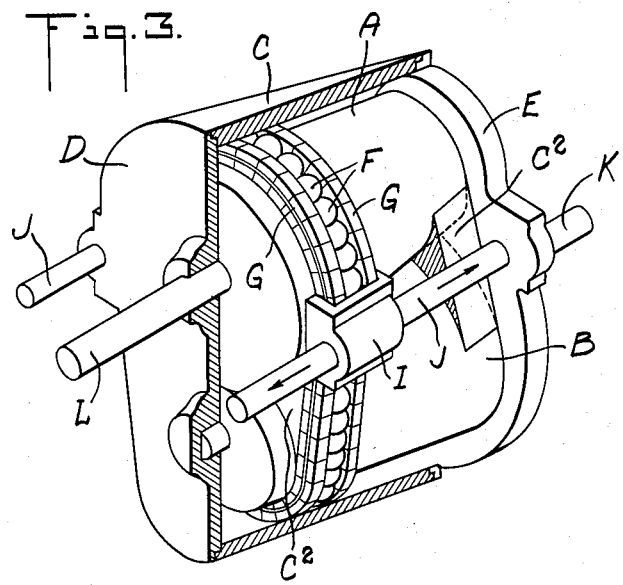
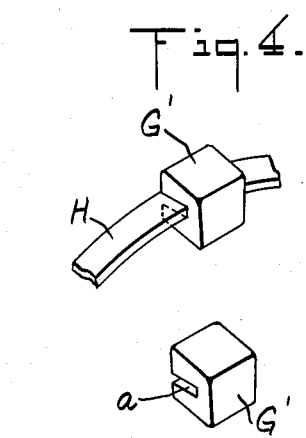
INVENTOR.
Antonina Alexeev
BY
ATTORNEYS May 8, 1956 A. ALEXEEV 2,744,414
TRANSMISSION SPEED CHANGER
Filed Jan. 26, 1953 2 Sheets-Sheet 2
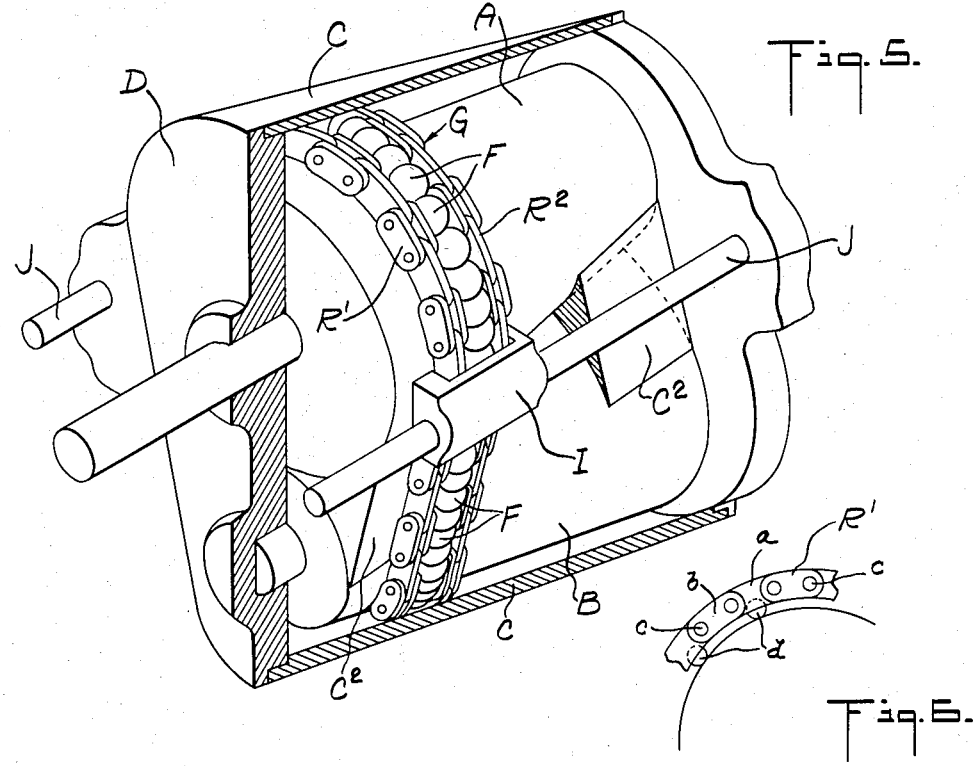
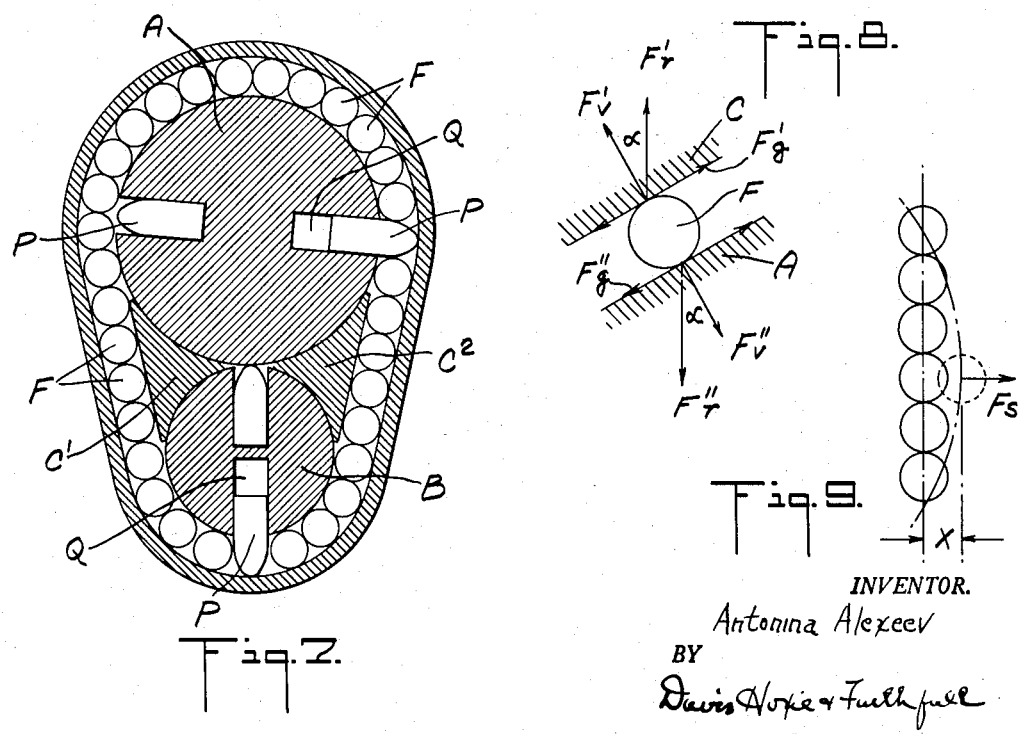
INVENTOR.
Antonina Alexeev
BY
Davis Hoxie & Faithfull
ATTORNEYS

United States Patent Office 2,744,414
Patented May 8, 1956

2,744,414

TRANSMISSION SPEED CHANGER

Antonina Alexeev, New York, N. Y.

Application January 26, 1953, Serial No. 333,054

14 Claims. (Cl. 74—216.3)

This invention relates to variable speed power transmissions. It has particular reference to an improved transmission of this type in which the increase or the decrease of the speed of the driven shaft, during rotation of the driving shaft at a constant speed, can be achieved gradually without disengaging or disconnecting the driving and driven shafts from each other during the speed-changing operation.

The transmission of the present invention not only allows the gradual change from a maximum speed to a minimum speed, and vice versa, but also allows any speed within these limits and permits the speed to be changed at any moment. For example, if the maximum speed of the driven shaft is chosen as the speed of the driving shaft, and a transmission ratio of 3:1 is used, the minimum speed of the driven shaft will be one-third the speed of the driving shaft; and there will be a whole series of driven shaft speeds between the speed of the driving shaft and one-third of the latter speed. The transmission can be radially adjusted to provide any driven shaft speed within these limits.

The power transmission made according to the invention comprises a pair of cones rotatably mounted on parallel axes with the reduced ends of the cones facing in opposite directions. A flexible raceway surrounds the two cones in the form of a loop lying in a plane generally normal to the cone axes, and this raceway contains a series of abutting anti-friction elements, such as hardened steel balls, adapted to roll in the raceway. The raceway is supported for movement parallel to the cone axes so that the series of rollable elements is adjustable to different axial positions along the cones, it being understood that by using cones of equal conicity the length of the shortest loop surrounding both cones will be the same at different positions spaced axially along the cone. Each cone is provided with catches spaced around its periphery, each catch being engageable with one of the rollable elements through part of a revolution of the cone. The series of rollable elements in the raceway substantially fill the latter around the loop, to form a driving medium inter-connecting the cones through the catches.

In any given position of the raceway, reckoned axially of the cones, the rollable anti-friction elements form a rigid driving connection between the two cones, so that rotation of one of the cones (the driving cone) will rotate the other cone (the driven cone). Thus, as the driving cone rotates, one of its catches engages a rollable element in the raceway while one of the catches on the driven cone engages another element in the raceway, so that rotation of the driving cone is transmitted through the first catch, the rollable elements filling the raceway between this catch and the second catch, and the second catch itself to the driven cone. After each cone has thus rotated, through part of a complete revolution, another catch thereon engages a rollable element in the raceway while the previously acting catch disengages the adjacent element; and the operation of the transmission is continued through the actions of the newly engaged catches. When it is desired to change the speed of the driven cone, the raceway is displaced axially of the cones. The driving operation continues as before, except that due to the different ratio between the cone circumference in the new position of the raceway, the driven cone will be driven at a different speed relative to the driving cone.

In the preferred construction of the new transmission, the two cones are mounted to rotate in a stationary housing which surrounds them with a clearance space between the cone peripheries and the inner wall of the housing, and the latter serves to retain the rollable elements in the raceway. The raceway includes a pair of flexible bands or belts looped around the cones and forming between them a channel for receiving the rollable elements. Between the cones are stationary means forming guide surfaces generally tangential to the cones and coacting with the housing to retain the rollable elements in the raceway when these elements are not engaged by the cones themselves. To provide for axial movement of the raceway, a guide may be mounted in the housing to extend parallel to the cone axes and support a sliding member engaging the raceway, whereby movement of the sliding member along the guide serves to displace the raceway (and the rollable elements within it) along the axes of the cones. The catches on the cones may be formed by elongated recesses in the peripheries of the cones extending longitudinally thereof, so that the catches are effective in any axial position of the raceway; or the catches may be formed by retractable fingers in the cones arranged to engage the rollable elements in any adjusted position of the raceway.

For a better understanding of the invention reference may be had to the accompanying drawings, in which:

Fig. 1 is a cross-sectional view of a preferred form of the new transmission;

Fig. 2 is a longitudinal sectional view on the line 2—2 in Fig. 1;

Fig. 3 is a perspective view of the transmission shown in Figs. 1 and 2, with parts broken away;

Figs. 4 and 4a are detailed perspective views of parts of the raceway;

Fig. 5 is a view similar to Fig. 3 showing a modified form of the transmission;

Fig. 6 is a detailed view of part of the raceway shown in Fig. 5;

Fig. 7 is a cross-sectional view of still another form of the new transmission, and Figs. 8 and 9 are force-diagrams illustrating the forces acting upon the rollable elements in the raceway.

Referring to Figs. 1 through 4a, the transmission there shown comprises a driven cone A and a driving cone B mounted to rotate on parallel axes represented by the driven and driving shafts L and K, respectively. The shafts K and L are journaled in a housing C having end plates D and E. As shown, the cones A and B have equal conicities or cone angles, and each cone is reversed with respect to the other cone so that the reduced ends of the cones face in opposite directions. The shaft K projects from the enlarged end of cone B through the adjacent end plate or cover E, so that it can be connected to a motor for driving the transmission; and the other shaft L projects from the enlarged end of cone A through the adjacent end plate D, so that it can be connected to the part to be driven by the transmission.

The housing C conforms to the configuration of the two cones A and B and is spaced from the peripheries of the cones to provide a clearance of uniform depth. Within the housing, in the angles formed between the two cones, are guide means $C^1$ and $C^2$ which present surfaces extending generally tangentially to the peripheral surfaces of the cones, it being understood that the guide means $C^1$—$C^2$ extend from end-to-end of the cones and are shaped to conform generally to the configurations of these angular spaces between the cones.

A series of anti-friction elements F, in the form of hardened steel balls, surrounds the two cones within the housing C. These balls are held in a raceway G located in the loop-shaped space formed by the housing C as the outer limit and the cones A—B and guide means $C^1$—$C^2$ as the inner limit. The raceway G comprises a pair of flexible belts spaced from each other to form between them a channel for the balls F, the belts lying in planes generally normal to the cone axes or shafts K and L. Each belt consists of a flexible endless band H, which may be a steel ribbon, and slotted elements $G^1$ arranged in end-to-end relation on the band. As best shown in Figs. 4 and 4a, the slot $a$ in each element $G^1$ receives the ribbon H. There are exactly as many elements $G^1$ on each ribbon H as is necessary to fill in the length of the ribbon around the cones A—B, with each element touching the adjacent ones and one of the cones or the surfaces presented by the guide means $C^1$—$C^2$, the ribbons H being of equal length. As best shown in Fig. 2, the surface of each element $G^1$ adjacent the housing wall, and the opposed surface of the element, are slanted somewhat to conform to the configuration of the clearance space within the housing.

The flexible raceway G is movable axially of the cones A and B. As shown, the housing C contains a pair of blocks I slidable in opposed longitudinal grooves in the housing. Each block I is recessed to receive the belts G and the adjacent balls F lying between these belts, and is connected to an actuating rod J slidably mounted in the end plates D and E. The actuating rods J extend parallel to the cone axes and the grooves for the blocks I. Thus, each actuating rod J also forms a guide on which the corresponding member I is slidable relative to the housing C. It will be understood that the blocks I serve not only to hold the belts G of the raceway in assembled relation at opposite sides of the intervening balls F, but also to displace the raceway and the balls axially of the cones through operation of the actuating rods J, which may be connected to a common actuator (not shown). The raceway G is preferably held against rotary movement about the cones, as by fitting the belt elements $G^1$ closely in the clearance space within the housing (Fig. 2).

The driving cone B is formed in its periphery with diametrically opposed, longitudinal recesses M forming catches $M^1$; and the driven cone A is formed with similar longitudinal recesses N forming catches $N^1$. As the driving cone B rotates in the direction of the arrow in Fig. 1, and one of the recesses M becomes exposed by moving from under the guide $C^2$, the ball F will be forced into this recess by the action of a leaf spring O″ secured to the inner wall of the housing and extending longitudinally thereof. When this spring is disengaged from the ball by further rotation of cone B, the ball will remain in the recess M due to the pressure from the balls F preceding it in the direction of rotation (as will be described presently), so that the ball will remain in engagement with the catch $M^1$ of the corresponding recess. Thus, the ball engaged by this catch $M^1$ will drive the balls F preceding it through the raceway G in the direction of the arrows. Due to the presence of another ball F in the next recess N, where it engages the corresponding catch $N^1$, the other cone A will be driven by cone B through the aforementioned ball in recess M and the balls preceding it up to and including the aforementioned ball in recess N.

It will be understood that as a recess N becomes exposed by moving beyond the guide $C^1$, a ball F is forced into it by the action of a leaf spring $O^1$ similar to spring O″. When further rotation of cone A disengages this ball from spring $O^1$, the ball will remain in the recess and against the corresponding catch $N^1$ due to the pressure between the balls and the tendency of the balls to occupy a larger space. More particularly, the balls preceding the catch M and following the catch N, and which form the driving connection between the cones, will be under pressure incident to the driving of cone A by cone B, so that the balls in the corresponding recesses M and N will be retained in those recesses even after disengaging the respective springs or biasing members O″ and $O^1$.

When the ball in recess M reaches the guide $C^1$, the latter acts to displace the ball from this recess upon further rotation of cone B. At the same time, or shortly prior thereto, another ball F enters the diametrically opposed recess M which has just emerged from under the guide $C^2$, so that the driving action is continued through the balls preceding the catch $M^1$ thus newly exposed. Similarly, when the ball in recess N reaches the guide $C^2$, the latter displaces the ball from this recess upon further rotation of cone A; and at the same time or prior thereto, another ball F enters the diametrically opposed recess N which has just emerged from the guide $C^1$, so that the driving is continued through the balls following the catch $N^1$ thus newly exposed.

Due to the absence of any substantial friction between the balls themselves, or between the balls and the other parts which they contact, the new transmission is highly efficient.

When it is desired to change the speed of cone A, the actuating rods J are operated to slide the blocks I in one direction or the other along the cones. Since these blocks receive and bracket the bands H and elements $G^1$ thereon, the belts G forming the raceway will move with the blocks. Being flexible, the raceway can adapt itself to the changes in the circumferences of the cones and the shape of the guides $C^1$—$C^2$ as it is moved along them by the blocks I. It will be understood that the length of a loop tightly encompassing the two cones will be the same for different axial positions along the cones (due to their equal cone angles and parallel axes), so that the raceway G becomes neither looser nor tighter around the cones as it moves along them parallel to their axes. The balls F move axially of the cones with the raceway G, in which they are retained by the housing C on the outside and the cones A—B and guides $C^1$—$C^2$ on the inside. Since the catches $M^1$ and $N^1$ and the springs $O^1$ and O″ extend from end to end of the cones, they will be effective in any adjusted position of the raceway G. The axial adjustment of the raceway can be effected while the transmission is in operation, since the balls can move axially along the cones and in the recesses or grooves M—N while the cones rotate, and can move along the springs $O^1$—O″ during such rotation.

The aforesaid axial adjustment of the raceway will, of course, change the speed ratio between the two cones A—B. Thus, when the raceway is at the extreme left of the housing as viewed in Fig. 2, the cone A will be driven at the lowest speed; and when the raceway is at the opposite end of the housing, the cone A will be driven at maximum speed. Between these extreme positions, the raceway can be adjusted to give the driven cone A an infinite number of different speeds.

The modification shown in Figs. 5 and 6 is similar to the apparatus previously described, except that the flexible raceway is of a different form. As shown in Figs. 5 and 6, the raceway comprises a pair of flexible belts in the form of endless steel chains $R^1$ and $R^2$ looped around the cones A and B and between which the balls F are retained in the clearance space within the housing. Each chain includes a series of solid links *a* (Fig. 6) which are separated from each other by cheeks *b* at opposite sides of the links, the cheeks and links being hinged together at adjacent ends by pivot pins *c*. The links *a* are each recessed to receive and retain a hardened steel ball *d* protruding from the inner face of the link, as shown in Fig. 6. The protruding parts of these balls rest upon the surfaces forming the inner confine of the clearance space in the housing, that is, either of the cones A—B or the guides C¹—C², depending upon the position of the ball. Thus, the chains are supported on the cones by means of the balls *d*, which greatly reduces the friction between the chains and the cones. The presence of the recesses or grooves M—N in the cones will not interfere with this support, because when a ball *d* is opposite a groove M or N, the corresponding part of the chain will be supported by the balls *d* adjacent the ball which is opposite the groove.

The embodiment shown in Fig. 7, is similar to that of Figs. 1-4, except that the ball catches are formed differently. According to Fig. 7, the catches comprise retractable fingers or blocks P slidable in longitudinal slots Q in the cones and having normally protruding ends which fit into the raceway G between the flexible belts thereof. When a protruding block P engages a guide C¹ or C² in the rotation of the cones, the guide cams it to a retracted position in its slot Q, so that it moves from its driving or driven position between two of the balls F. At the same time, the diametrically opposite block P in the same cone moves radially outward between two other balls to occupy the resulting space opened between the balls. The force which pushes the blocks outward may be centrifugal force, or it may be derived from springs (not shown) seated in the slots Q. When the raceway G is moved axially of the cones, to vary the speed ratio between them, the blocks P must also be adjusted to maintain their positions in line with the space between the flexible belts of the raceway. This axial adjustment of the blocks may be effected by stopping the transmission and adjusting the blocks manually, or in any other suitable manner.

The embodiment of Fig. 7 has particular utility in cases where it is not necessary to change the speed ratio between the driving and driven shafts. In such cases, the driving and driven members B and A may be cylindrical instead of conical, and the balls F may be confined within a stationary raceway in place of the flexible, adjustable raceway G. The resulting transmission, while not adjustable as to speed ratio, is advantageous because of the relatively small frictional forces involved. The other embodiments here described and illustrated may be similarly arranged to provide a single speed ratio.

Referring now to Fig. 8, the force $F^1r$ is the force acting upon each ball F during operation of the transmission. Against the surface of the housing C, force $F^1r$ is resolved into two forces, namely, $F^1g$ acting on the sloping surface of the housing, and $F^1v$ perpendicular to $F^1g$. Thus, there is a tendency for the ball to roll up the inner sloping surface of the housing C axially of the cones (toward the larger end of cone A). On the other hand, the force $F^1r$ has a reaction $F''r$ equal and opposite to it and which, against the surface of cone A, is resolved into forces $F''g$ and $F''v$. Since $F^1r = F''r$, and $F^1g = F^1r \times$ sine of $\alpha$ (the cone angle), and $F''g = F''r \times$ sine of $\alpha$; then $F^1g = F''g$ and the forces are balanced. This makes it clear that the lateral strain on the raceway belts G or R is theoretically zero. In practice, the strain will be very slight, depending upon the precision of the size and roundness of the balls and the cones, the details of the raceway balts, etc. The latter should be made as precisely as possible to prevent any bending or flexing of the raceway in the axial direction of the cones, since the resulting side pressure $Fs$ on the balls will be in direct proportion to the amplitude of such a bend (Fig. 9).

I claim:

1. A variable speed power transmission comprising a pair of cones rotatably mounted on parallel axes with the reduced ends of the cones facing in opposite directions, a flexible raceway surrounding the cones in the form of a loop lying in a plane generally normal to said axes, a series of anti-friction rolling elements rollable in the raceway and disposed in generally abutting relation around the cones, means supporting the raceway for movement parallel to said axes, whereby said series of elements is movable to different axial positions along the cones, and catches on each cone spaced around the periphery thereof and each engageable with one of said elements through part of a revolution of the cone, said series of elements substantially filling the raceway around the loop to form a driving medium interconnecting the cones through the catches.

2. A variable speed transmission according to claim 1, in which said anti-friction elements are balls.

3. A variable speed transmission according to claim 1, comprising also a housing surrounding the cones and the raceway and forming a retaining wall holding said elements in the raceway.

4. A variable speed transmission according to claim 1, in which said raceway includes a pair of flexible bands forming a channel between them for receiving said elements.

5. A variable speed transmission according to claim 1, in which said raceway includes a pair of chains forming a channel between them for receiving said elements.

6. A variable speed transmission according to claim 1, comprising also a housing supporting the cones and forming therewith a loop-shaped space surrounding the cones and in which the raceway is movable on said supporting means.

7. A variable speed transmission according to claim 1, comprising also a housing supporting the cones and forming therewith a loop-shaped space surrounding the cones and in which the raceway is movable on said supporting means, the supporting means including a guide on the housing extending parallel to said axes, and a member slidable relative to the housing on the guide and engaging the raceway to move it axially on the cones.

8. A variable speed transmission according to claim 1, in which said catches are formed by elongated recesses in the peripheries of the cones extending generally lengthwise thereof.

9. A variable speed transmission according to claim 1, in which said catches are formed by elongated recesses in the peripheries of the cones extending generally lengthwise thereof, the transmission also including biasing members engageable with said elements as they move around the loop and urging said elements into the recesses.

10. A variable speed transmission according to claim 1, in which said catches are retractable fingers in the cones.

11. A variable speed transmission according to claim 1, in which said catches are retractable fingers in the cones, the cones having slots extending generally lengthwise thereof in which the fingers are slidable.

12. A variable speed transmission according to claim 1, comprising also stationary means interposed between the cones and forming guide surfaces generally tangential to the cones for retaining said elements in the raceway.

13. A variable speed transmission according to claim 1, comprising also stationary means interposed between the cones and forming guide surfaces generally tangential to the cones for retaining said elements in the raceway, and a stationary housing surrounding the cones and the raceway in opposed relation to said guide surfaces and to the cone surfaces adjacent said loop, the inner surface of the housing forming a retaining wall for holding said elements in the raceway.

14. A variable speed transmission according to claim 1, comprising also stationary means interposed between the cones and forming guide surfaces generally tangential to the cones for retaining said elements in the raceway, a stationary housing surrounding the cones and the raceway in opposed relation to said guide surfaces and to the cone surfaces adjacent said loop, the inner surface of the housing forming a retaining wall for holding said elements in the raceway, the supporting means for the raceway including a guide secured to the housing and extending parallel to said axes, and a member slidable on the guide relative to the housing and engaging the raceway to move it axially of the cones.

References Cited in the file of this patent

UNITED STATES PATENTS

| | | |
|---|---|---|
| 759,873 | Evans et al. | May 17, 1904 |
| 2,491,764 | Quillen | Dec. 20, 1949 |
| 2,551,821 | Bengston | May 8, 1951 |

FOREIGN PATENTS

| | | |
|---|---|---|
| 298,668 | Italy | July 12, 1932 |